US010198291B2

(12) United States Patent
Boehm et al.

(10) Patent No.: US 10,198,291 B2
(45) Date of Patent: Feb. 5, 2019

(54) RUNTIME PIGGYBACKING OF CONCURRENT JOBS IN TASK-PARALLEL MACHINE LEARNING PROGRAMS

(71) Applicant: INTERNATIONAL BUSINESS MACHINES CORPORATION, Armonk, NY (US)

(72) Inventors: Matthias Boehm, San Jose, CA (US); Berthold Reinwald, San Jose, CA (US); Shirish Tatikonda, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 15/452,571

(22) Filed: Mar. 7, 2017

(65) Prior Publication Data

US 2018/0260246 A1  Sep. 13, 2018

(51) Int. Cl.
*G06F 9/48* (2006.01)
*G06N 99/00* (2010.01)

(52) U.S. Cl.
CPC ......... *G06F 9/4887* (2013.01); *G06N 99/005* (2013.01)

(58) Field of Classification Search
CPC .................................................. G06F 9/4887
See application file for complete search history.

(56) References Cited

U.S. PATENT DOCUMENTS

| 8,483,240 | B2 | 7/2013 | Ross et al. |
| 8,484,649 | B2 | 7/2013 | Hildrum et al. |
| 8,612,368 | B2 | 12/2013 | Burdick et al. |
| 8,793,674 | B2 | 7/2014 | Ravi et al. |
| 9,232,372 | B2 | 1/2016 | Toksvig et al. |
| 9,286,044 | B2 | 3/2016 | Boehm et al. |
| 9,405,582 | B2 | 8/2016 | Fuller et al. |
| 2005/0232286 | A1 | 10/2005 | Lee et al. |
| 2009/0044196 | A1* | 2/2009 | Stefansson ............ G06F 9/5027 718/106 |
| 2012/0226639 | A1* | 9/2012 | Burdick .................. G06F 8/427 706/12 |
| 2014/0207755 | A1 | 7/2014 | Hacigumus et al. |

(Continued)

OTHER PUBLICATIONS

Hybrid Parallelization Strategies for LargeScale Machine Learning in SystemML, Boehm et al., 40th International Conference on Very Large Data Bases, Sep. 1-5, 2014, Hangzhou, China. Proceedings of the VLDB Endowment, vol. 7, No. 7 (Year: 2014).*

(Continued)

*Primary Examiner* — Charlie Sun
(74) *Attorney, Agent, or Firm* — Sherman IP LLP; Kenneth L. Sherman; Steven Laut

(57) ABSTRACT

One embodiment provides a method for runtime piggybacking of concurrent data-parallel jobs in task-parallel machine learning (ML) programs including intercepting, by a processor, executable jobs including executable map reduce (MR) jobs and looped jobs in a job stream. The processor queues the executable jobs, and applies runtime piggybacking of multiple jobs by processing workers of different types. Runtime piggybacking for a ParFOR (parallel for) ML program is optimized including configuring the runtime piggybacking based on processing worker type, degree of parallelism and minimum time thresholds.

20 Claims, 6 Drawing Sheets

(56) References Cited

U.S. PATENT DOCUMENTS

| | | | |
|---|---|---|---|
| 2014/0351391 A1* | 11/2014 | Madani | H04W 4/003 709/220 |
| 2014/0359073 A1 | 12/2014 | Mendoza | |
| 2015/0378696 A1* | 12/2015 | Boehm | G06F 8/45 717/149 |
| 2016/0110176 A1 | 4/2016 | Fink et al. | |
| 2016/0124730 A1 | 5/2016 | Boehm et al. | |

OTHER PUBLICATIONS

Anonymously, "Using flexible slots and cross-assignment to increase MapReduce resource utilization", Jan. 10, 2014, pp. 1-8, ip.com, United States.

Quiane-Ruiz, J-A. et al., "RAFTing MapReduce: Fast Recovery on the Raft", Proceedings of 2011 IEEE 27th International Conference on Data Engineering (ICDE), Apr. 11-16, 2011, pp. 589-600, IEEE, United States.

Ghoting, A. et al., "SystemML: Declarative Machine Learning on MapReduce", Proceedings of the 2011 IEEE 27th International Conference on Data Engineering (ICDE), Apr. 11-16, 2011, pp. 231-242, IEEE, United States.

Mell, P., et al., "The NIST Definition of Cloud Computing", National Institute of Standards and Technology Special Publication 800-145, Sep. 2011, pp. 1-7, U.S. Department of Commerce, United States.

* cited by examiner

RUNTIME PIGGYBACKING OF CONCURRENT JOBS IN TASK-PARALLEL MACHINE LEARNING PROGRAMS

BACKGROUND

Declarative, large-scale machine learning (ML) on top of MapReduce (MR) or Spark aims at automatically generating execution plans for high-level ML programs with the goals of full flexibility and high performance. The primary focus of large-scale ML is data parallel computation, but many ML algorithms inherently exhibit opportunities for task parallelism as well. In one example, the ParFOR (parallel for) construct allows to combine data and task parallelism. For medium to large data and non-partitionable problems, the ParFOR optimizer picks local parallel plans, which run MR jobs for independent iterations concurrently on the cluster. This allows for latency hiding and higher cluster utilization. In addition, these MR jobs, which may run concurrently, often share common inputs and hence read the same data. This exposes optimization potential in case of small or highly utilized clusters because the available degree of parallelism is too small for all concurrently running jobs. This problem cannot be addressed with a pure compile-time approach because, especially for ML programs with convergence-based computations, the number of required iterations and conditional control flow are initially unknown.

SUMMARY

Embodiments relate to runtime piggybacking of concurrent jobs in task-parallel ML programs. One embodiment provides a method for runtime piggybacking of concurrent jobs in task-parallel machine learning (ML) programs including intercepting, by a processor, executable jobs including executable map reduce (MR) jobs and looped jobs in a job stream. The processor queues the executable jobs, and applies runtime piggybacking of processing workers for the executable jobs based on processing worker type. Runtime piggybacking for a ParFOR (parallel for) ML program is optimized including configuring the runtime piggybacking based on processing worker type, degree of parallelism and minimum time thresholds.

These and other features, aspects and advantages of the present invention will become understood with reference to the following description, appended claims and accompanying figures.

DETAILED DESCRIPTION

Figure 1:
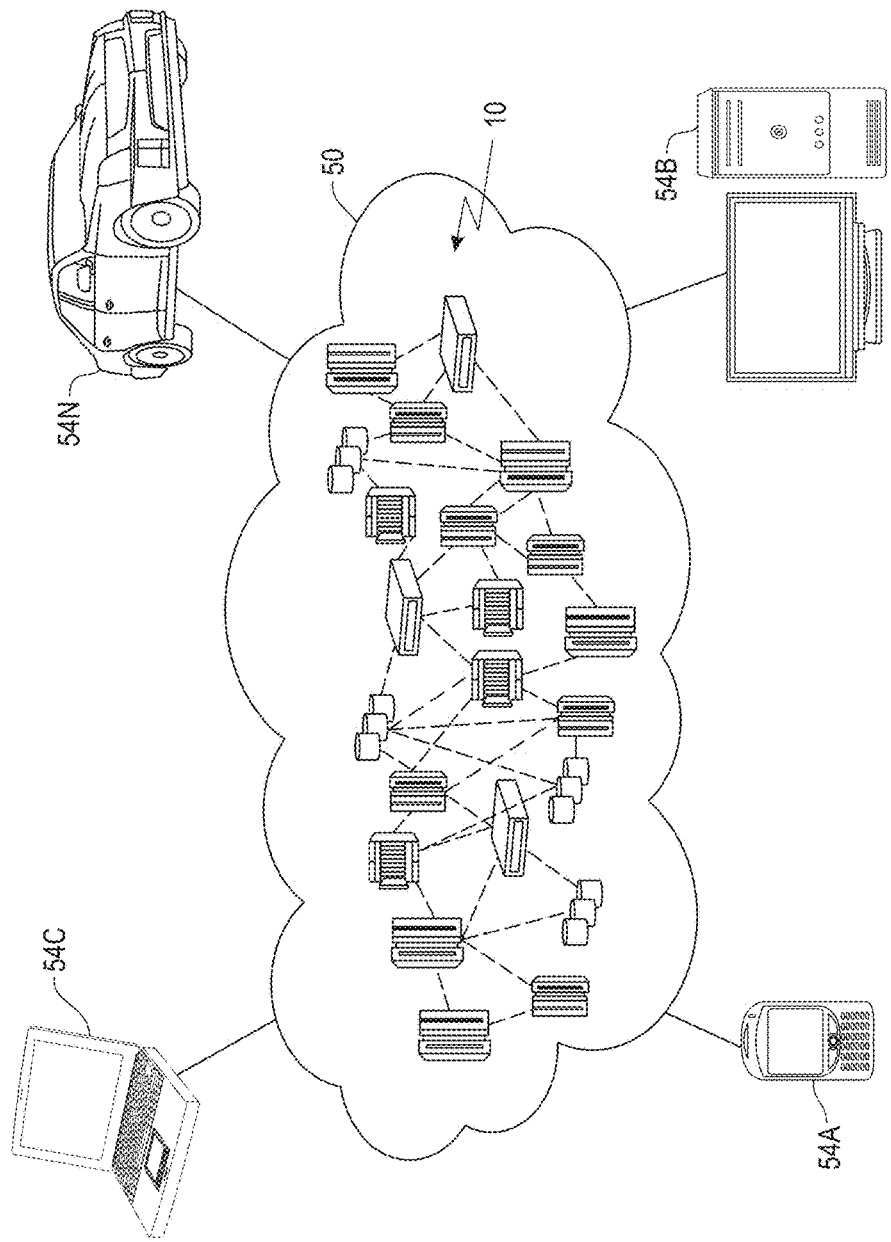
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for runtime piggybacking of concurrent data-parallel jobs in task-parallel machine learning (ML) programs. One embodiment includes intercepting, by a processor, executable jobs including executable map reduce (MR) jobs and looped jobs in a job stream. The processor queues the executable jobs, and applies runtime piggybacking of multiple jobs by processing workers of different types. Runtime piggybacking for a ParFOR (parallel for) ML program is optimized including configuring the runtime piggybacking based on processing worker type, degree of parallelism and minimum time thresholds.

One or more embodiments are directed to shared MR clusters, which by definition do not have any buffer pool or table scan piggybacking mechanisms and that are bound by cluster resources for computing and memory usage. One or more embodiments relate to iterative ML workloads where compile-time multi-query optimization is infeasible. One or more embodiments introduce techniques for when and how to merge concurrent, data-parallel jobs according to the changing utilization of the given MR cluster. A data parallel job executes one or more functions over a collection of objects (potentially distributed) in parallel.

In one or more embodiments, runtime piggybacking intercepts concurrent MR job submissions and repeatedly executes a wait-merge-submit-return loop. In this repeated workflow, queued job submissions are merged into a smaller or equal number of MR jobs, the shared MR jobs are executed, and the job results are redistributed in a transparent manner to the invoking clients, which are in this case runtime instructions. This architecture is beneficial as it leaves the runtime unchanged while still exploiting the benefits of runtime piggybacking.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
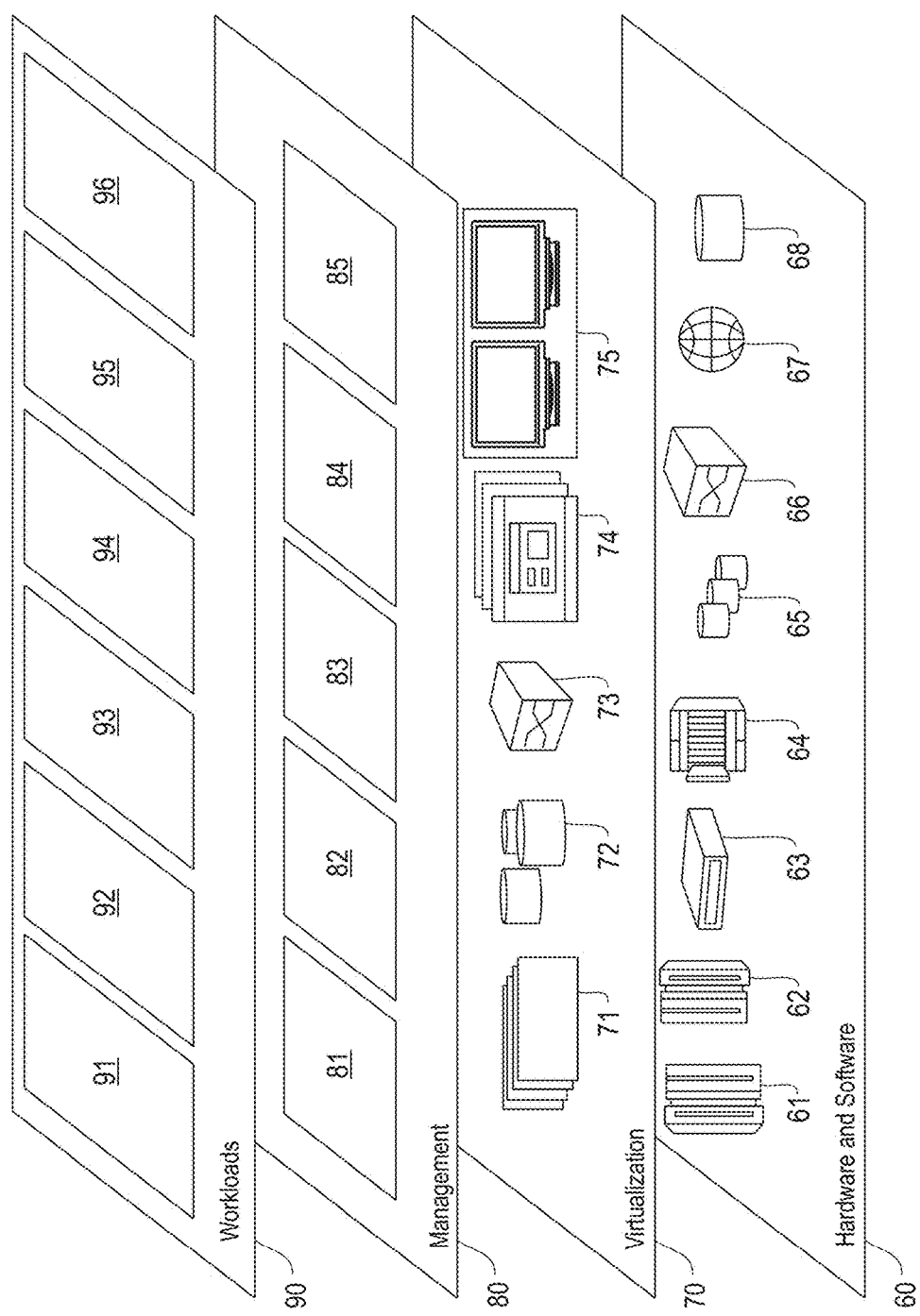
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dedicated ParFOR and automatic creation of optimal parallel execution plans during runtime processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
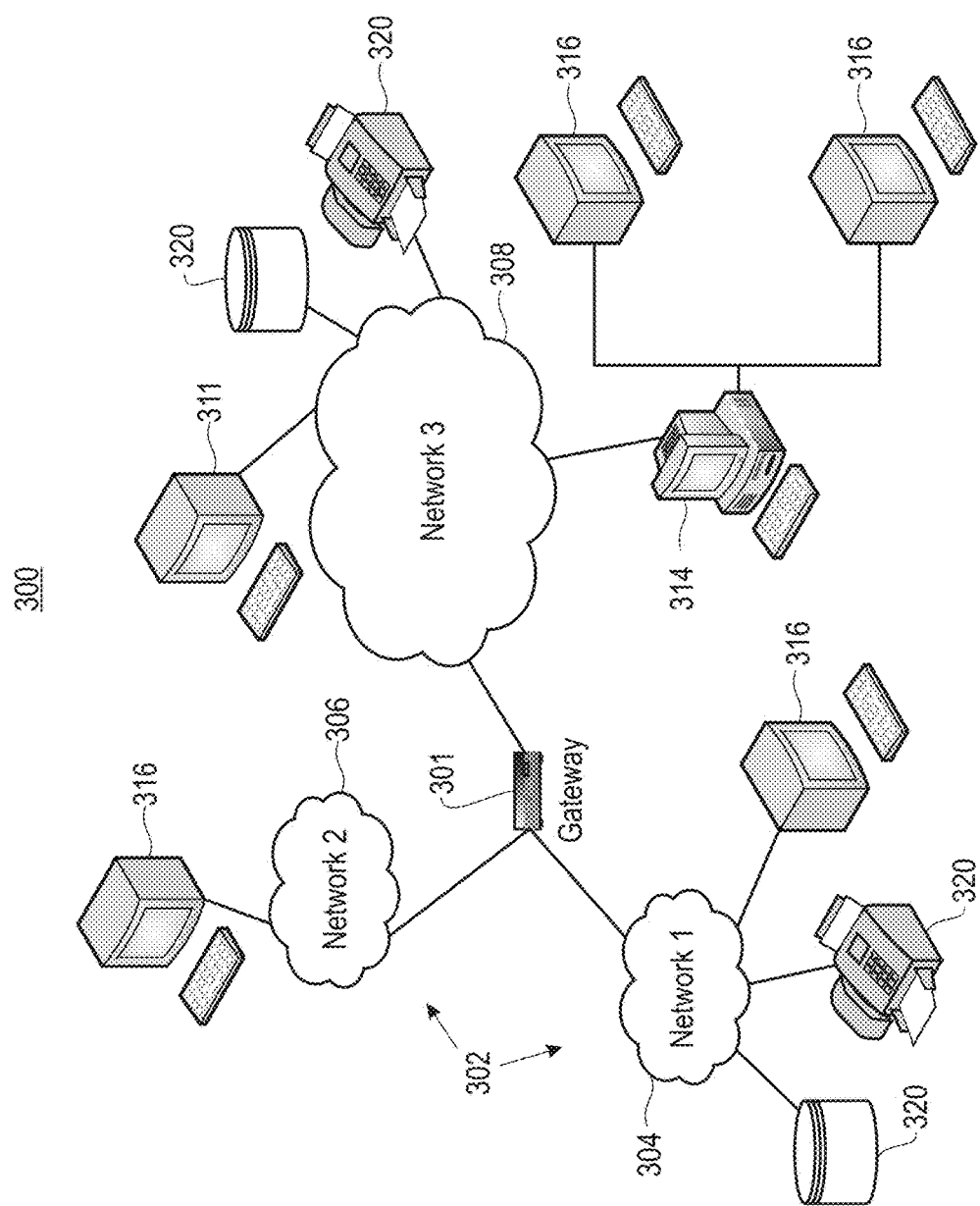
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
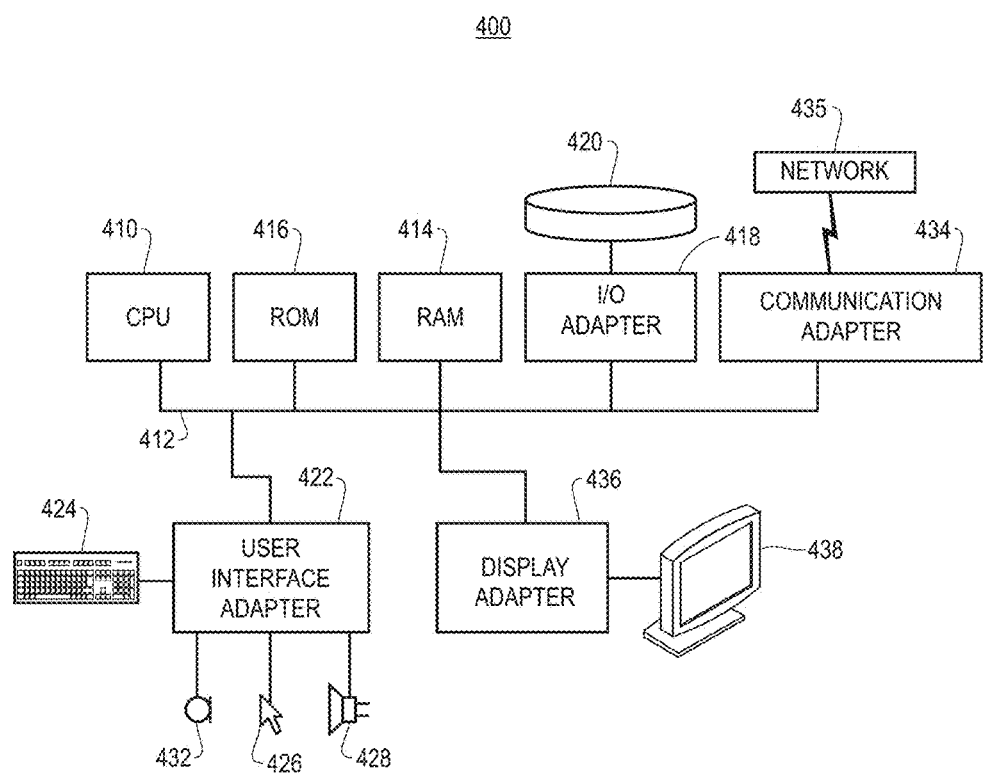
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
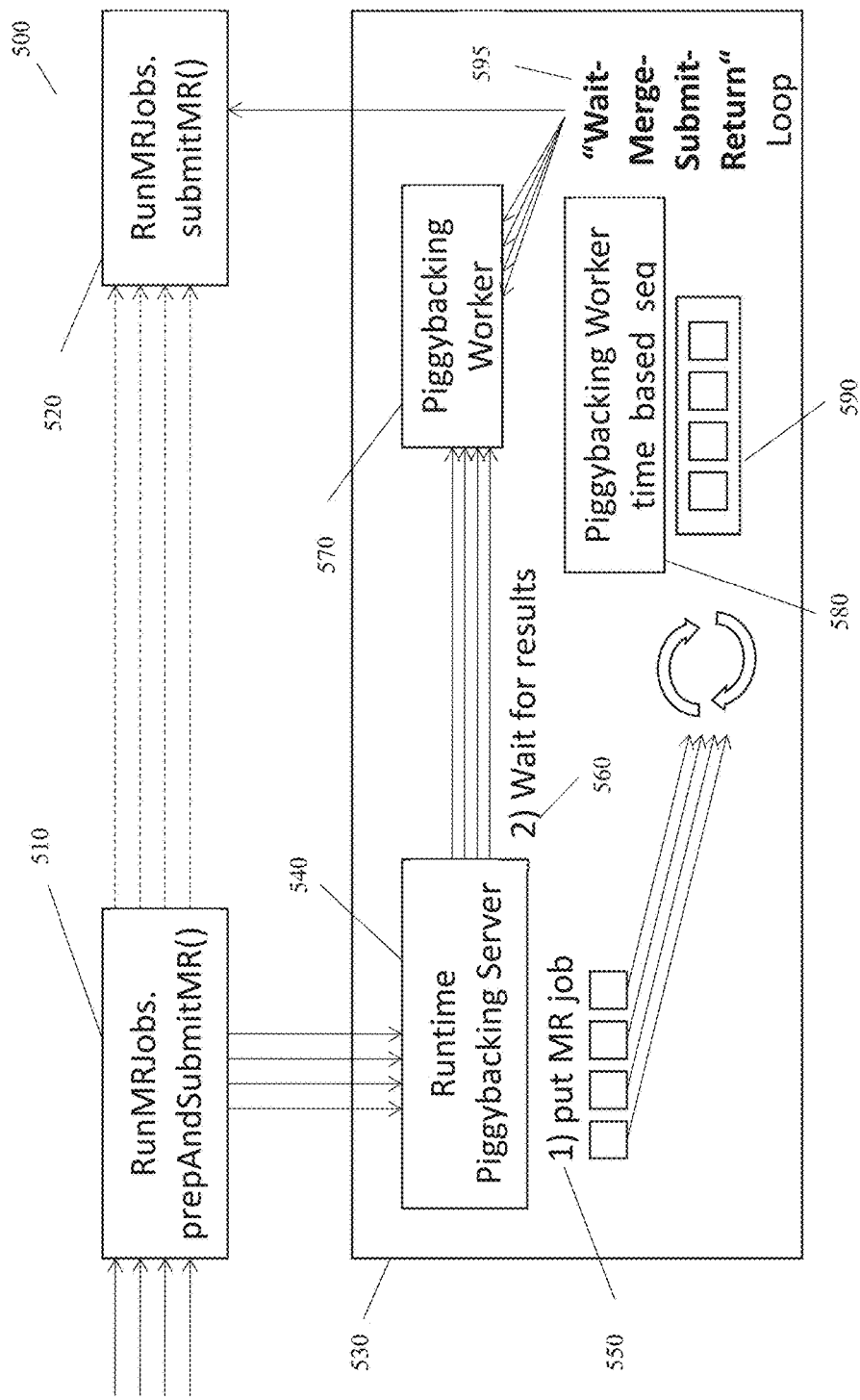
FIG. 5 is a block diagram illustrating a runtime piggybacking system for using a dedicated ParFOR and for automatically creating of optimal parallel execution plans during runtime, according to one embodiment.

FIG. 5 is a block diagram illustrating a runtime piggybacking system 500 for using a dedicated ParFOR and for automatically creating optimal parallel execution plans during runtime, according to one embodiment. In one embodiment, the runtime piggybacking system 500 intercepts running MR jobs and queues the intercepted jobs at block 510, and also intercepts and queues looped jobs for a wait-merge-submit-return loop 595 at block 520. The piggybacking environment 530 includes a server (or runtime piggybacking server) 540 that creates processing (or piggybacking) workers 570 using one or more processors. In one embodiment, the server 540 puts MR jobs at 550, waits for results at 560, and processes the piggybacked processing workers 590 based on type (e.g., time_based_seq) at block 580.

In one embodiment, the major primitives (e.g., data processing primitives: mappers and reducers) include the compiler-aware merge of MR jobs and their runtime instructions that takes various constraints, such as the memory budget/allocation of tasks (for broadcast variables) into account, the submission of shared MR jobs, and the final redistribution of results.

In one embodiment, the runtime piggybacking worker types use various alternative techniques for realizing runtime piggybacking workers. In one embodiment, the processing worker types include:

TBS (Time-Based, Sequential), wait time, merge, submit and wait for job;

UTBP (Utilization-Time-Based, Parallel) wait minimum time, job utility and maximum time thresholds, where processing includes submitting jobs in parallel; and UDBP (Utilization-Decay-Based, Parallel) wait minimum time, job utility threshold with exponential time decay, where processing includes submitting jobs in parallel and utilization refers to cluster utilization, which can be obtained for example from Hadoop MRv1's JobTracker or Hadoop YARN's ResourceManager by probing (1) the currently running map/reduce tasks vs task capacity, or (2) the currently used memory/cores vs memory/core capacity, respectively.

In one embodiment, the server 540 optimizes re-writes for automatically deciding on applying runtime piggybacking for a given ParFOR ML program. This also includes decisions on the configuration of runtime piggybacking such as the processing worker types, degree of parallelism, and minimum time thresholds.

In one embodiment, the server 500 performs cluster utilization corrections. Many runtime processing workers 570 depend on cluster utilization information. In one example embodiment, for a Hadoop MRv1 environment, the cluster utilization is defined as the ratio of occupied map/reduce slots to the available slot capacity. In another example embodiment, for a Hadoop Yarn (MRv2) environment, corrections are based on used virtual cores and memory resources as compared to the cluster resource capacity.

In one embodiment, an example may include the following:

```
X = read("./xxxxxx/piggybacking/X");
parfor( i in 1:ncol(X) ){
    v = matrix(1,rows=ncol(X),cols=1);
    tmp = X %*% v;
    print(sum(tmp))
}.
```

In one or more embodiments, runtime piggybacking processing by the server 500 may be implemented for all ParFOR scripts with local parallel execution of concurrent MR jobs (large data per iteration). Examples may include: univariate statistics, bivariate statistics, Kmeans, multiclass SVM, Naïve Bayes, meta learning (cross validation/ensemble learning), transform (data preparation), stepwise linear regression, stepwise GLM, decision tree/random forest, etc. The server 500 may provide for improvements (theoretical up to k, where k is the ParFOR local degree of parallelism on the driver node (i.e., usually up to the number of virtual cores on the driver)), where the processing time improvements depend on data size (the larger, the larger the improvements for piggybacked jobs with shared reads).

Figure 6:
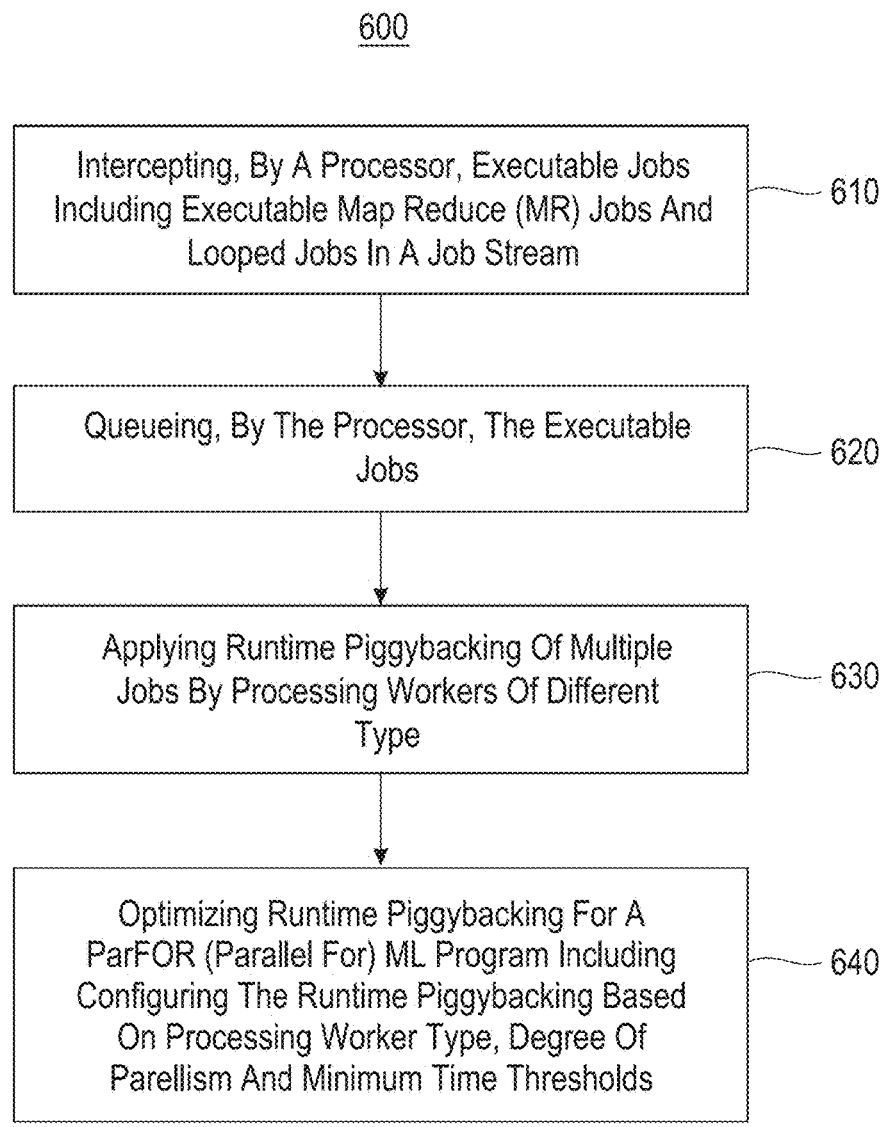
FIG. 6 illustrates a block diagram for a process for a dedicated ParFOR and automatically creation of optimal parallel execution plans during runtime, according to one embodiment.

FIG. 6 illustrates a block diagram for a process 600 for a dedicated ParFOR and automatically creation of optimal parallel execution plans during runtime, according to one embodiment. In one embodiment, in block 610 process 600 provides for intercepting, by a processor (e.g., a processor of server 500, FIG. 5), executable jobs including executable map reduce (MR) jobs and looped jobs (e.g., wait-merge-submit-return loop jobs) in a (MR) job stream. In block 620 the process 600 provides for queuing, by the processor, the executable jobs. In block 630 the process 600 provides for applying runtime piggybacking of multiple jobs (e.g., multiple jobs of different type and constraints) by processing workers (e.g., piggybacking workers 570, FIG. 5) of different type. In block 640 process 600 provides for optimizing runtime piggybacking for a ParFOR ML program including configuring the runtime piggybacking based on processing worker type, degree of parallelism and minimum time thresholds.

In one embodiment, process 600 may further provide for correcting application of runtime piggybacking the processing workers based on cluster utilization information. In one embodiment, major primitives for the executable jobs include a computer-aware merge of the MR jobs and associated runtime instructions based on memory constraints and job type compatibility. In one embodiment, process 600 may further include redistributing results of the computer-aware merge of the MR jobs and associated runtime instructions.

In one embodiment, for process 600 the processing worker types may include: TBS worker type that is based on wait time and job merge, and processing comprises submitting a processing worker and waiting for job completion; UTBS type that is based on waiting a predetermined minimum time threshold, job utility and a predetermined maximum time threshold, and processing comprises submitting jobs in parallel; and UDBP that is based on waiting a minimum time, job utility threshold with an exponential time decay, and processing comprises submitting jobs in parallel.

In one embodiment, process 600 may provide that in a first Hadoop type environment (e.g., Hadoop MRv1), the cluster utilization information comprises a ratio of occupied map or reduce slots to available slot capacity, and for a second Hadoop type environment (e.g., Hadoop Yarn (MRv2)), the cluster information is based on introducing corrections based on used virtual cores and memory resources as compared to cluster resource capacity.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for runtime piggybacking of concurrent data-parallel jobs in task-parallel machine learning (ML) programs comprising:
   intercepting, by a processor, executable jobs including executable map reduce (MR) jobs and looped jobs in a job stream;
   queuing, by the processor, the executable jobs;
   applying runtime piggybacking of multiple jobs by processing workers of different type; and
   optimizing runtime piggybacking for a ParFOR (parallel for) ML program including configuring the runtime piggybacking based on processing worker type, degree of parallelism and minimum time thresholds.

2. The method of claim 1, further comprising:
   correcting application of runtime piggybacking the processing workers based on cluster utilization information.

3. The method of claim 2, wherein the looped jobs comprise wait-merge-submit-return loop jobs, and the multiple jobs comprise jobs of different types and constraints.

4. The method of claim 2, wherein major primitives for the executable jobs comprise:
   a computer-aware merge of the MR jobs and associated runtime instructions based on memory constraints and job type compatibility.

5. The method of claim 4, further comprising:
   redistributing of results of the computer-aware merge of the MR jobs and associated runtime instructions.

6. The method of claim 2, wherein the processing worker types comprise:
   time-based, sequential (TBS) worker type that is based on wait time and job merge, and processing comprises submitting a processing worker and waiting for job completion;
   utilization-time-based, parallel (UTBS) type that is based on waiting a predetermined minimum time threshold, job utility and a predetermined maximum time threshold, and processing comprises submitting jobs in parallel; and
   utilization that is time decay based, parallel (UDBP) that is based on waiting a minimum time, job utility threshold with an exponential time decay, and processing comprises submitting jobs in parallel.

7. The method of claim 2, wherein for a first Hadoop type environment, the cluster utilization information comprises a ratio of occupied map or reduce slots to available slot capacity, and for a second Hadoop type environment, the cluster information is based on introducing corrections based on used virtual cores and memory resources as compared to cluster resource capacity.

8. A computer program product for runtime piggybacking of concurrent data-parallel jobs in task-parallel machine learning (ML) programs, the computer program product comprising a non-transitory computer readable device having program instructions embodied therewith, the program instructions executable by a processor to cause the processor to:
   intercept, by the processor, executable jobs including executable map reduce (MR) jobs and looped jobs in a job stream; queue, by the processor, the executable jobs;
   apply, by the processor, runtime piggybacking of multiple jobs by processing workers of different type; and
   optimize, by the processor, runtime piggybacking for a ParFOR (parallel for) ML program including configuring the runtime piggybacking based on processing worker type, degree of parallelism and minimum time thresholds.

9. The computer program product of claim 8, further comprising program instructions executable by the processor to cause the processor to:
   correct, by the processor, application of runtime piggybacking the processing workers based on cluster utilization information.

10. The computer program product of claim 9, wherein the looped jobs comprise wait-merge-submit-return loop jobs, and the multiple jobs comprise jobs of different types and constraints.

11. The computer program product of claim 9, wherein major primitives for the executable jobs comprise:
    a computer-aware merge of the MR jobs and associated runtime instructions based on memory constraints and job type compatibility.

12. The computer program product of claim 11, further comprising program instructions executable by the processor to cause the processor to:
    redistribute, by the processor, of results of the computer-aware merge of the MR jobs and associated runtime instructions.

13. The computer program product of claim 9, wherein the processing worker types comprise:
    time-based, sequential (TBS) worker type that is based on wait time and job merge, and processing comprises submitting a processing worker and waiting for job completion;
    utilization-time-based, parallel (UTBS) type that is based on waiting a predetermined minimum time threshold, job utility and a predetermined maximum time threshold, and processing comprises submitting jobs in parallel; and
    utilization that is time decay based, parallel (UDBP) that is based on waiting a minimum time, job utility threshold with an exponential time decay, and processing comprises submitting jobs in parallel.

14. The computer program product of claim 9, wherein for a first Hadoop type environment, the cluster utilization information comprises a ratio of occupied map or reduce slots to available slot capacity, and for a second Hadoop type environment, the cluster information is based on introducing corrections based on used virtual cores and memory resources as compared to cluster resource capacity.

15. An apparatus comprising:
    a memory configured to store instructions; and
    a server including a processor configured to execute the instructions to:
    intercept executable jobs including executable map reduce (MR) jobs and looped jobs in a job stream;
    queue the executable jobs;
    apply runtime piggybacking of multiple jobs by processing workers of different type; and optimize runtime piggybacking for a ParFOR (parallel for) ML program including configuring the runtime piggybacking based on processing worker type, degree of parallelism and minimum time thresholds.

16. The apparatus of claim 15, wherein the processor is further configured to execute the instructions to:
    correct application of runtime piggybacking the processing workers based on cluster utilization information.

17. The apparatus of claim 15, wherein the looped jobs comprise wait-merge-submit-return loop jobs, the multiple jobs comprise jobs of different types and constraints, and a ParFOR optimizer processor is configured to determine application of the runtime piggybacking.

18. The apparatus of claim 16, wherein major primitives for the executable jobs comprise:
a computer-aware merge of the MR jobs and associated runtime instructions based on memory constraints and job type compatibility, and the processor is further configured to execute the instructions to redistribute results of the computer-aware merge of the MR jobs and associated runtime instructions.

19. The apparatus of claim 16, wherein the processing worker types comprise:
time-based, sequential (TBS) worker type that is based on wait time and job merge, and processing comprises submitting a processing worker and waiting for job completion;
utilization-time-based, parallel (UTBS) type that is based on waiting a predetermined minimum time threshold, job utility and a predetermined maximum time threshold, and processing comprises submitting jobs in parallel; and
utilization that is time decay based, parallel (UDBP) that is based on waiting a minimum time, job utility threshold with an exponential time decay, and processing comprises submitting jobs in parallel.

20. The apparatus of claim 16, wherein for a first Hadoop type environment, the cluster utilization information comprises a ratio of occupied map or reduce slots to available slot capacity, and for a second Hadoop type environment, the cluster information is based on introducing corrections based on used virtual cores and memory resources as compared to cluster resource capacity.

* * * * *